United States Patent
Lee et al.

(10) Patent No.: US 10,283,078 B2
(45) Date of Patent: May 7, 2019

(54) ADAPTIVE DISPLAY PARTIAL UPDATE METHODS AND APPARATUS THEREOF FOR POWER SAVING IN PIXEL PROCESSING

(71) Applicant: MediaTek Inc., Hsinchu (TW)

(72) Inventors: Wen-Fu Lee, Taichung (TW); Te-Hao Chang, Taipei (TW); Ying-Jui Chen, Hsinchu County (TW)

(73) Assignee: MediaTek Inc., Hsinchu (TW)

( * ) Notice: Subject to any disclaimer, the term of this patent is extended or adjusted under 35 U.S.C. 154(b) by 187 days.

(21) Appl. No.: 15/407,237

(22) Filed: Jan. 16, 2017

(65) Prior Publication Data

US 2017/0124981 A1    May 4, 2017

Related U.S. Application Data

(60) Provisional application No. 62/280,741, filed on Jan. 20, 2016.

(51) Int. Cl.
*G09G 3/20* (2006.01)
*G09G 5/00* (2006.01)
*G06K 9/62* (2006.01)

(52) U.S. Cl.
CPC .......... *G09G 5/003* (2013.01); *G06K 9/6212* (2013.01); *G09G 2310/04* (2013.01); *G09G 2310/08* (2013.01); *G09G 2320/0266* (2013.01); *G09G 2330/021* (2013.01)

(58) Field of Classification Search
CPC .............. G09G 2300/0816; G09G 2310/04
See application file for complete search history.

(56) References Cited

U.S. PATENT DOCUMENTS

| | | | | |
|---|---|---|---|---|
| 2002/0113781 | A1* | 8/2002 | Ishiyama | G09G 3/20 345/204 |
| 2010/0134684 | A1* | 6/2010 | Yamada | G09G 5/14 348/553 |
| 2012/0139952 | A1* | 6/2012 | Imai | G09G 5/34 345/672 |
| 2012/0140833 | A1* | 6/2012 | Takada | H04N 19/20 375/240.26 |
| 2012/0144397 | A1* | 6/2012 | Imai | G09G 5/14 718/103 |

* cited by examiner

*Primary Examiner* — Sanghyuk Park
(74) *Attorney, Agent, or Firm* — Han IP PLLC; Andy M. Han

(57) ABSTRACT

Methods and apparatuses pertaining to adaptive display partial update may involve determining whether partial update for an image frame is allowed and, responsive to a determination that the partial update for the image frame is allowed, determining whether the partial update is applicable to the image frame. Responsive to a determination that the partial update is applicable to the image frame, whether or not at least a difference between one or more properties of the image frame and one or more properties of a previous image frame exceeds a threshold may be determined. A partial-frame processing may be performed to partially update the image frame responsive to a determination that the difference does not exceed the threshold.

16 Claims, 11 Drawing Sheets

S: Steady state, e.g. in which the effect of content adjustment does not change with time
T: Transient state, e.g. in which the effect of content adjustment changes with time

ADAPTIVE DISPLAY PARTIAL UPDATE METHODS AND APPARATUS THEREOF FOR POWER SAVING IN PIXEL PROCESSING

CROSS REFERENCE TO RELATED PATENT APPLICATION(S)

The present disclosure is part of a non-provisional application claiming the priority benefit of U.S. Patent Application No. 62/280,741, filed on 20 Jan. 2016, which is incorporated by reference in its entirety.

TECHNICAL FIELD

The present disclosure is generally related to display control and, more particularly, to methods and apparatus pertaining to adaptively updating a display partially.

BACKGROUND

Unless otherwise indicated herein, approaches described in this section are not prior art to the claims listed below and are not admitted to be prior art by inclusion in this section.

Displays, also referred to as display devices or display panels, are widely used in a variety of electronic devices, appliances and apparatuses for displaying information to a user. Traditionally, when any aspect to a content being displayed changes from one image frame to the next, the entire image frame is updated, and the process is known as display full update. A display full update to the image frame can adjust the content being displayed without having any blocking artifact as a result. However, as the entire image frame is updated during a display full update, there is no power saving.

With display partial update, rather than updating the entire content being displayed when a part of the content changes from one image frame to the next, the display partial update refreshes, adjusts or otherwise updates the pixels that need to be changed without changing other pixels. Accordingly, there may be some power saving as not the entire image frame is updated. However, under conventional approaches, display partial update is unable to perform content adjustment because blocking artifact may result.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose a novel scheme for adaptive display partial update. The proposed scheme avoids the issues described above with respect to conventional approaches. Under the proposed scheme of adaptive display partial update, some image frames may be partially updated while other image frames may be fully updated. Moreover, adaptive display partial update in accordance with the present disclosure may perform content adjustment without having any blocking artifact as a result. Additionally, the proposed scheme helps achieve power saving due to the need to process fewer pixels as a result of adaptive display partial update.

In one aspect, a method in accordance with the present disclosure may involve determining whether partial update for an image frame is allowed, and determining whether the partial update is applicable to the image frame responsive to a determination that the partial update for the image frame is allowed. The method may also involve determining whether at least a difference between one or more properties of the image frame and one or more properties of a previous image frame exceeds a threshold responsive to a determination that the partial update is applicable to the image frame. The method may further involve performing a partial-frame processing to partially update the image frame responsive to a determination that the difference does not exceed the threshold.

In another aspect, a method in accordance with the present disclosure may involve receiving a plurality of image frames. The method may also involve adaptively performing a respective content adjustment for each image frame of the plurality of image frames such that at least one of the image frames is fully updated and at least another of the image frames is partially updated for the respective content adjustment.

In another aspect, an apparatus in accordance with the present disclosure may include a processor capable of receiving one or more input image frames to provide one or more output image frames. The processor may include an update switch control circuit, an update timing control circuit, a content detection circuit and a content adjustment circuit. The update timing control circuit may be capable of determining whether partial update for each input image frame of the one or more input image frames is allowed. The content detection circuit may be capable of determining whether the partial update is applicable to the input image frame responsive to a determination that the partial update for the input image frame is allowed. The update switch control circuit may be capable of determining whether at least a difference between one or more properties of the input image frame and one or more properties of a previous image frame exceeds a threshold responsive to a determination that the partial update is applicable to the input image frame. The content adjustment circuit may be capable of performing at least a partial-frame processing to partially update the input image frame to provide a respective one of the one or more output image frames responsive to a determination that the difference does not exceed the threshold.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Under the proposed scheme, adaptive display partial update may be performed on input image frames to provide output image frames such that, in generating the output image frames, a partial-frame processing may be performed on one or more image frames of the input image frames as partial update for content adjustment while a full-frame processing may be performed on one or more other image frames of the input image frames as full update for content adjustment. The partial-frame processing may be performed for partial update such that there is no blocking artifact in the resultant output image frame(s). The adaptive display partial update may involve determination of when to allow partial update, determination of whether a given image frame is suitable for partial update (e.g., whether partial update is applicable to the given image frame), adaptively or selectively switching between partial update and full update depending on one or more factors, and performing of the partial-frame processing for partial update or full-frame processing for full update depending on the situation for each image frame. Advantageously, adaptive display partial update under the proposed scheme contributes to power saving in pixel processing. Moreover, unlike conventional approaches for display partial update, adaptive display partial update under the proposed scheme leaves no blocking artifact in the partially update image frames.

Figure 1:
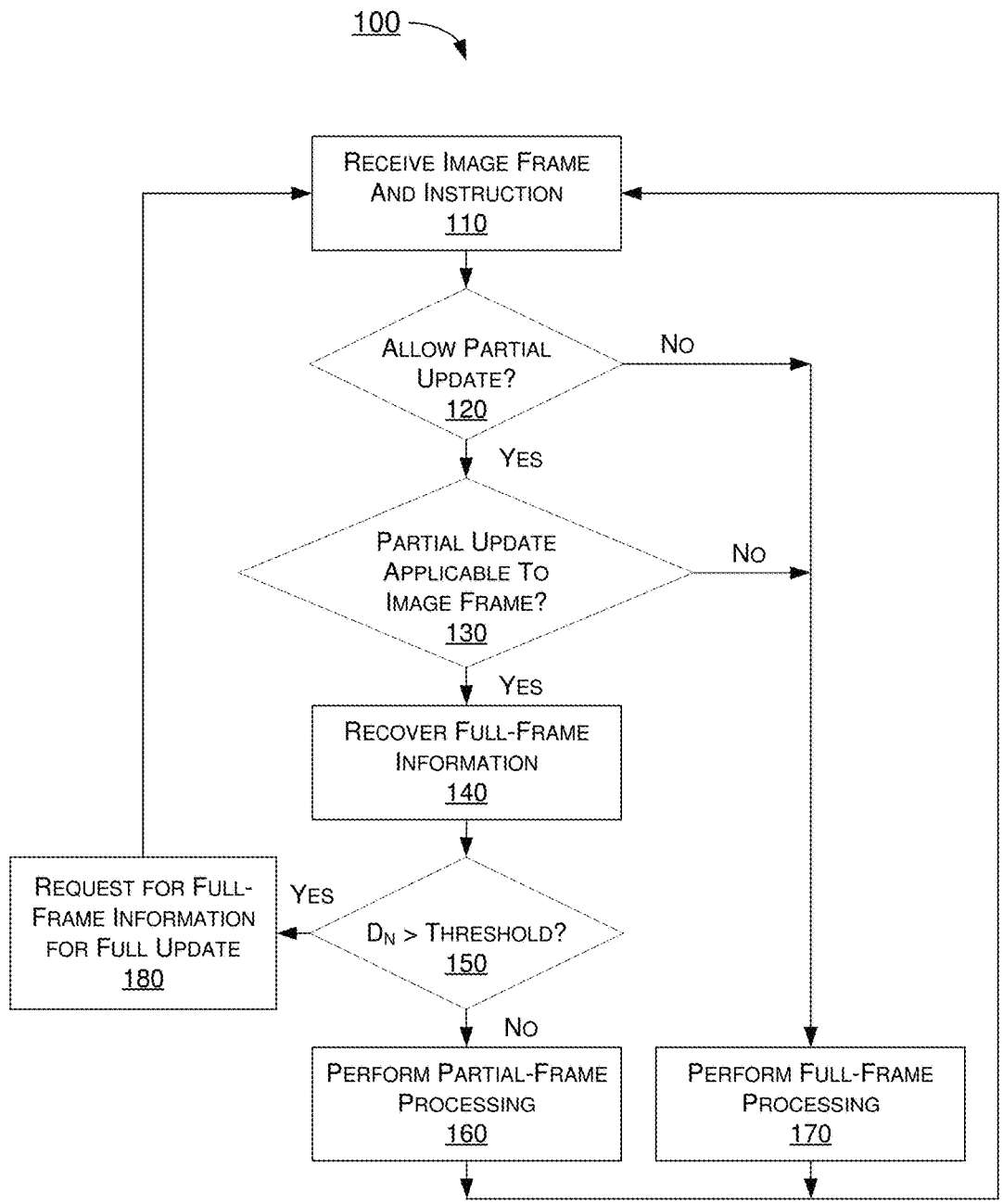
FIG. 1 is a diagram of an example scheme in accordance with an implementation of the present disclosure.

FIG. 1 illustrates an example scheme 100 in accordance with an implementation of the present disclosure. Scheme 100 may involve one or more operations, actions and/or functions as represented by one or more blocks such as blocks 110, 120, 130, 140, 150, 160, 170 and 180 shown in FIG. 1. Although illustrated as discrete blocks, various blocks of scheme 100 may be divided into additional blocks, combined into fewer blocks, or eliminated, depending on the desired implementation. Moreover, although arranged in a specific order as shown in FIG. 1, the blocks of scheme 100 may be re-arranged into different orders depending on the desired implementation. Each of FIG. 2-FIG. 8 illustrates a respective example scenario in accordance with an implementation of scheme 100. Accordingly, scheme 100 is described below with reference to FIG. 2-FIG. 8. Scheme 100 may be implemented by a control logic, a processor and an electronic apparatus, each of which implementable in hardware operable with appropriate firmware, software and/or middleware. For illustrative purposes and without limitation, the following description of scheme 100 is provided in the context of a processor (e.g., an image processor) implementable in an electronic apparatus (e.g., a smartphone, a tablet or a laptop computer).

At 110, scheme 100 may involve the processor receiving a number of input image frames to correspondingly provide a number of output image frames. For instance, the processor may receive each image frame of the input image frames from an application (e.g., a software program) for displaying the output image frames on a display device (e.g., a display panel of the electronic apparatus). In some implementations, the processor may also receive a respective instruction from the application for each image frame of the input image frames. The instruction may include one or more commands, including a command or indication for the processor to perform a full update or a partial update for the respective input image frame.

Scheme 100 may proceed from 110 to 120. For simplicity, the description of blocks 120, 130, 140, 150, 160, 170 and 180 is provided with respect to a given input image frame (hereinafter interchangeably referred as "image frame") of the number of input image frames. In some implementations, blocks 120, 130, 140, 150, 160, 170 and 180 of scheme 100 may pertain to a situation in which the application instructs the processor to perform partial update on the image frame and the processor performs a number of checks before actually performing partial update on the image frame.

At 120, scheme 100 may involve the processor determining whether partial update is allowed for the image frame. In an event that it is determined that partial update is not allowed, scheme 100 may proceed from 120 to 170. In an event that it is determined that partial update is allowed, scheme 100 may proceed from 120 to 130.

Figure 2:
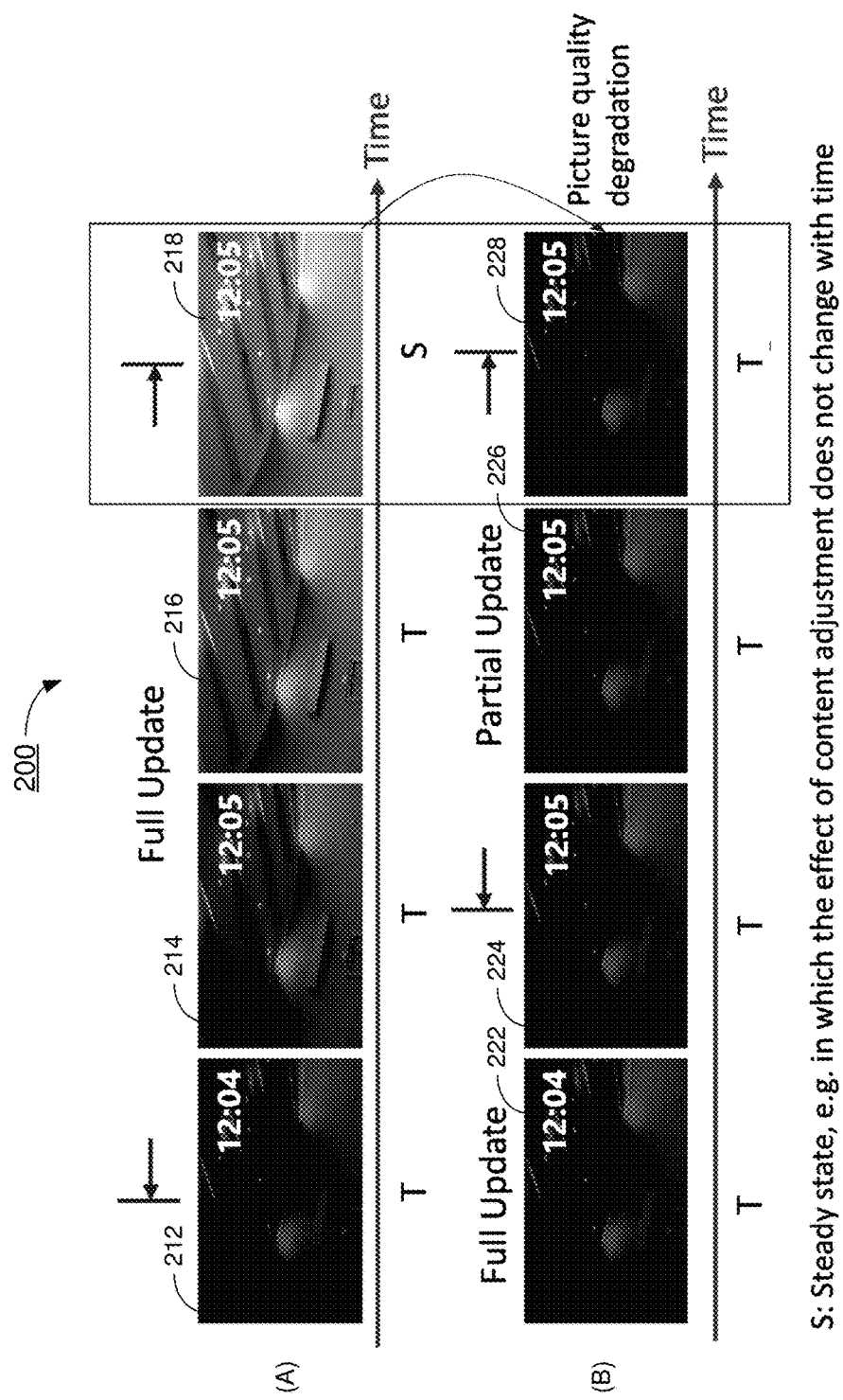
FIG. 2 is a diagram of an example scenario in accordance with an implementation of the present disclosure.

Referring to scenario 200 shown in FIG. 2, in determining whether partial update is allowed for a given image frame, scheme 100 may involve the processor determining whether a steady state would be achieved with a full-frame processing which is for full update. For instance, in an event that the processor determines that a steady state (e.g., a state in which the effect of content adjustment does not change with time) would be achieved with full update, the processor may determine that partial update for the image frame is allowed. This is to avoid picture quality degradation in case partial update is performed when full update is actually needed. Conversely, in an event that the processor determines that a transient state (e.g., a state in which the effect of content adjustment changes with time), instead of a steady state, would be achieved with full update, the processor may determine that partial update for the image frame is not allowed.

In part (A) of scenario 200, full update is performed on a respective input image frame to provide a respective output image frame. For instance, as shown in FIG. 2, full update is performed on an input image frame to provide a respective output image frame 212; full update is performed on another input image frame to provide a respective output image frame 214; full update is performed on yet another input image frame to provide a respective output image frame 216; and full update is performed on still another input image frame to provide a respective output image frame 218. Each of image frames 212, 214 and 216 is in a transient state while image frame 218 is in a steady state. In part (B) of scenario 200, full update is performed on a first input image frame to provide a first output image frame, while partial update is performed on each of a number of subsequent input image frames to provide a respective output image frame. For instance, as shown in FIG. 2, full update is performed on an input image frame to provide a respective output image frame 222; partial update is performed on another input image frame to provide a respective output image frame 224; partial update is performed on yet another input image frame to provide a respective output image frame 226; and partial update is performed on still another input image frame to provide a respective output image frame 228. Each of image frames 222, 224, 226 and 228 is in a transient state. As can be seen, performing partial update when partial update is not allowed would result in picture quality degradation, as evident in a comparison between image frame 218 and image frame 228.

At 170, scheme 100 may involve the processor performing a full-frame processing on the image frame for full update. Scheme 100 may proceed from 170 to 110 for the processor to receive a subsequent image frame (and corresponding instruction) from the application for processing. Referring to scenario 300 shown in FIG. 3, a full-frame processing for full update is performed on each of $Frame_{N-1}$, $Frame_N$ and $Frame_{N+1}$ to provide a respective subsequent frame. For instance, full update is performed on an input image frame, $Frame_{N-1}$, and apply content adjustment (CA) to provide a respective output image frame. Similarly, full update is performed on another input image frame, $Frame_N$, and apply CA to provide a respective output image frame. Likewise, full update is performed on another input image frame, $Frame_{N+1}$, and apply CA to provide a respective output image frame.

Figure 3:
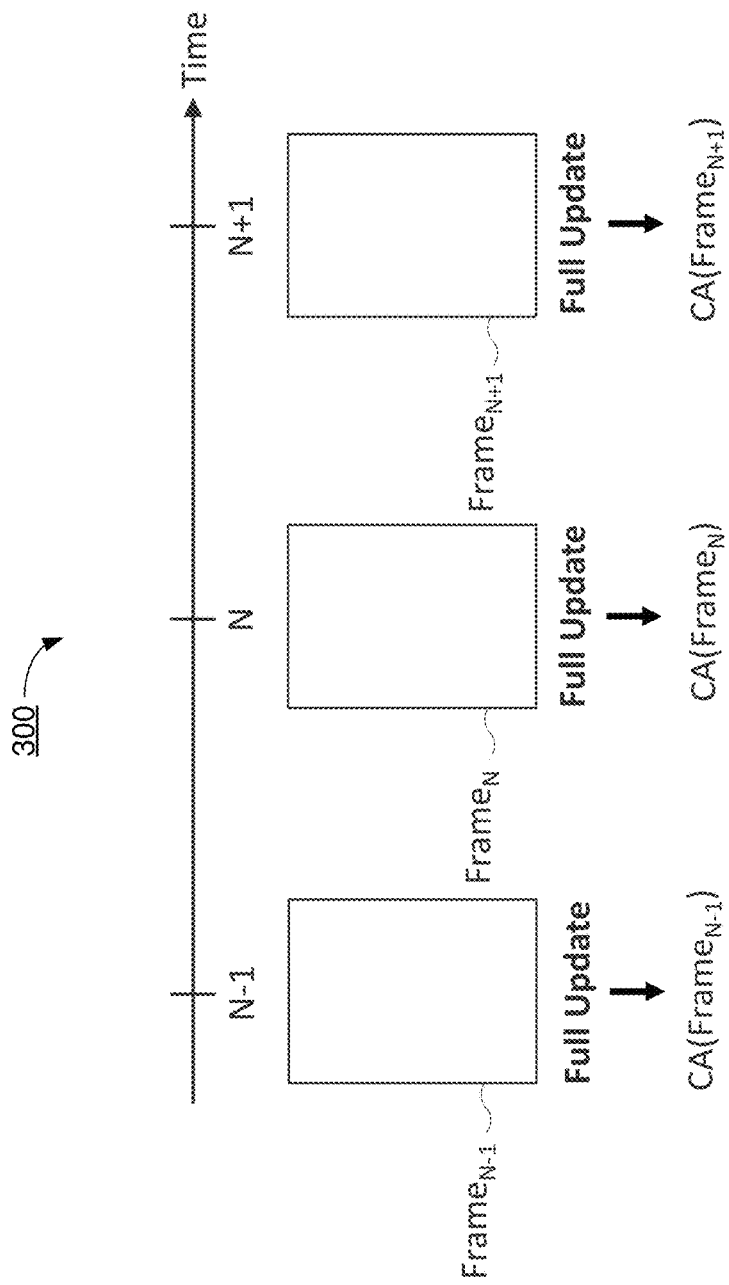
FIG. 3 is a diagram of an example scenario in accordance with an implementation of the present disclosure.
Figure 4:
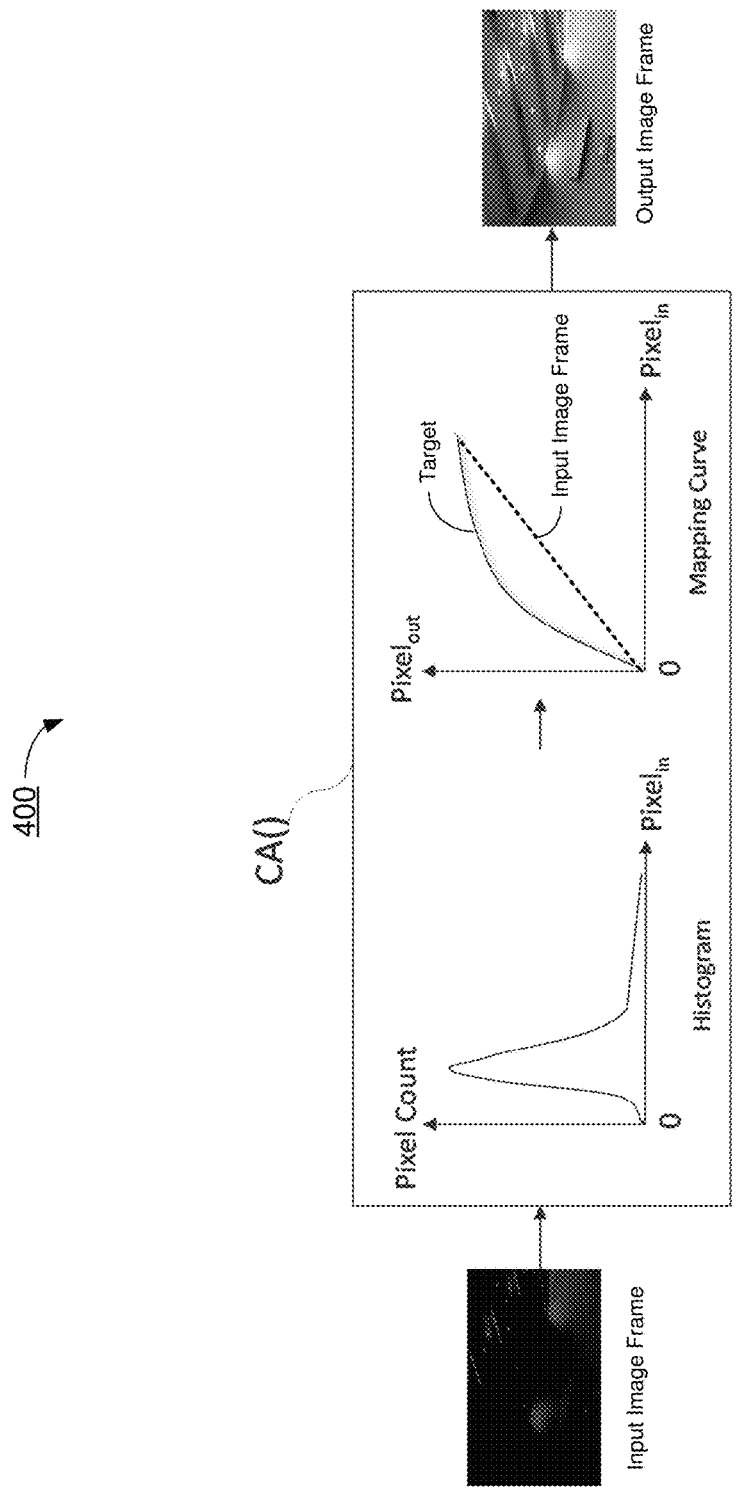
FIG. 4 is a diagram of an example scenario in accordance with an implementation of the present disclosure.
Figure 5:
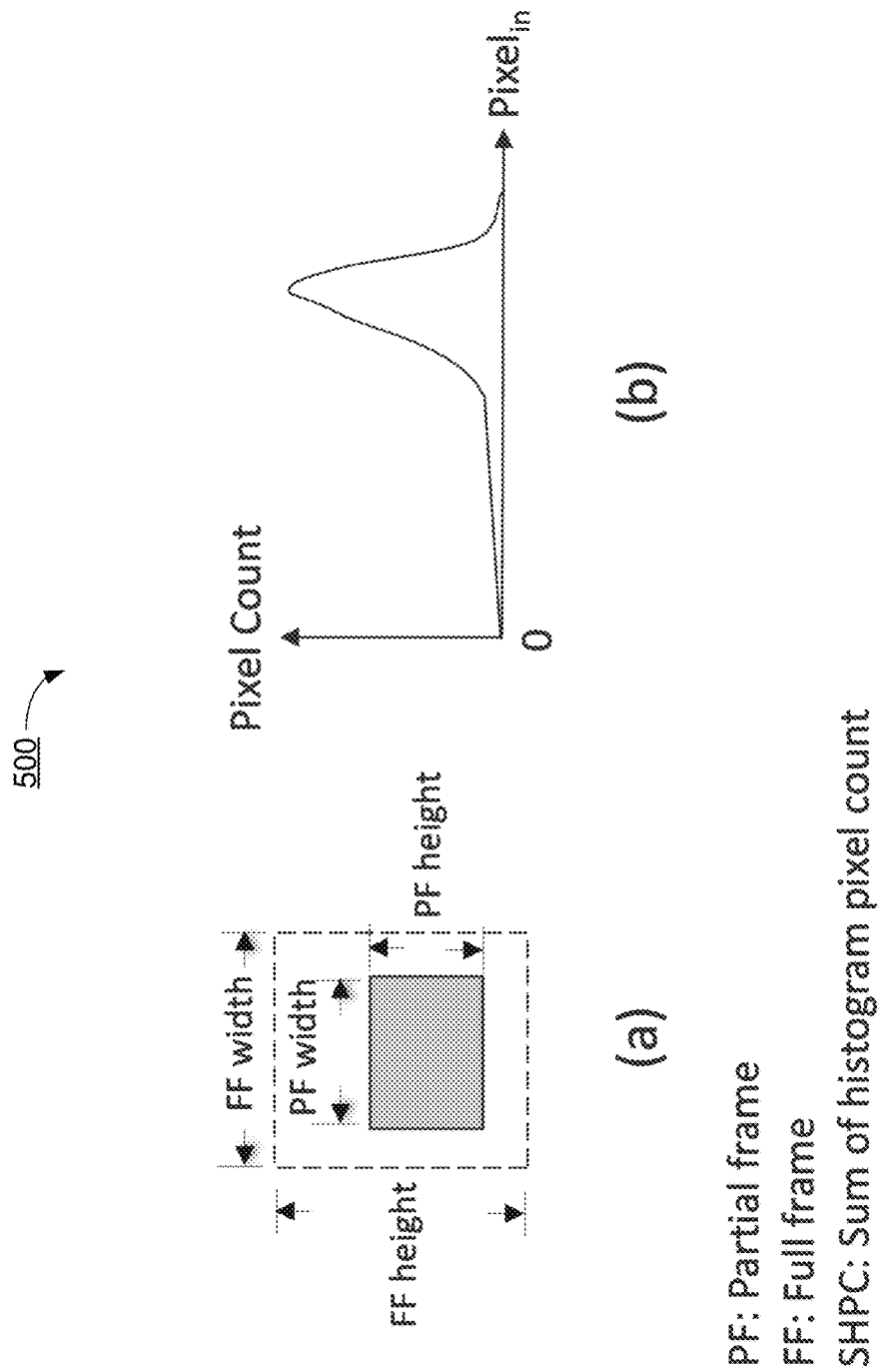
FIG. 5 is a diagram of an example scenario in accordance with an implementation of the present disclosure.
Figure 6:
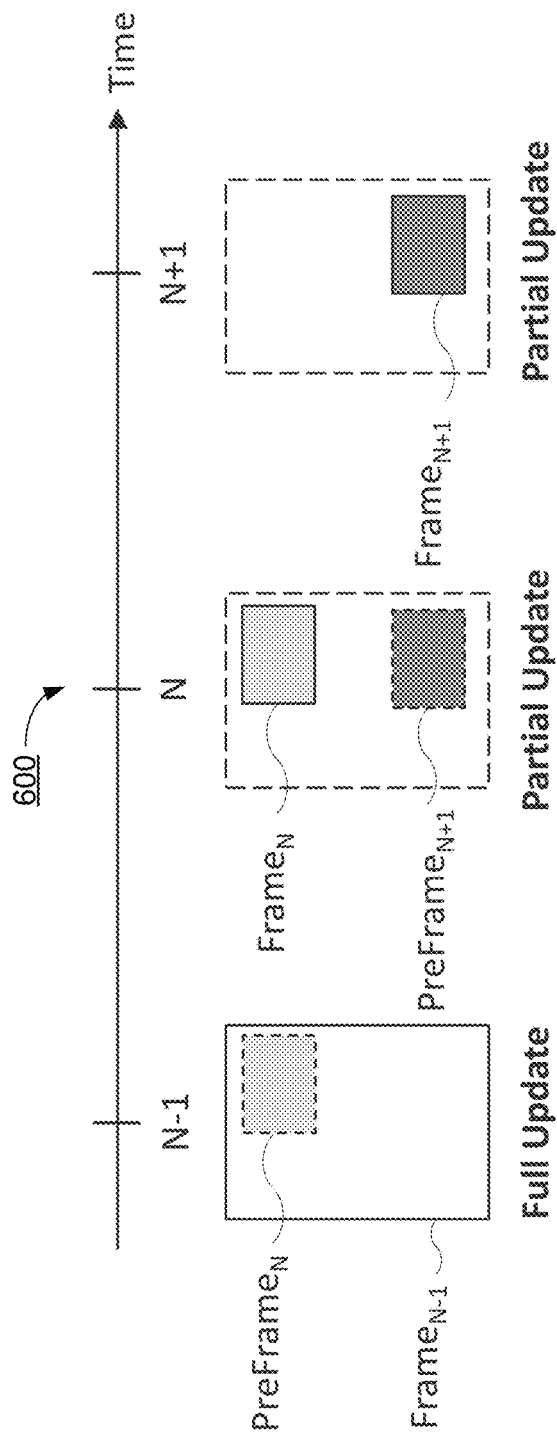
FIG. 6 is a diagram of an example scenario in accordance with an implementation of the present disclosure.

In performing the full-frame processing for full update, scheme 100 may take the full-frame content of a given image frame as input to a content adjustment function (denoted as "CA(image frame)" in FIG. 3) performed on the image frame. Referring to scenario 400 shown in FIG. 4, in some implementations, the content adjustment function may represent a function of enhancing the contrast of a given image frame. In alternative implementations, the content adjustment function may represent a function of changing color(s), tone(s), brightness or any other aspect of an image frame. In the example shown in FIG. 4, in providing an output image frame with an input image frame, the content adjustment function may utilize histogram information (e.g., a histogram of pixel count of the pixels of an input image frame) to obtain a target curve (e.g., a tone mapping curve) of a target image frame, and then perform mapping on that input image frame according to the target curve. The mapping curve of the input image frame may be compared to a curve of a target image frame which is to be achieved by full update performed by the content adjustment function.

At 130, scheme 100 may involve the processor determining whether partial update is applicable to or otherwise suitable for the image frame. In an event that it is determined that partial update is applicable to the image frame, scheme 100 may proceed from 130 to 140. In an event that it is determined that partial update is not applicable to the image frame, scheme 100 may proceed from 130 to 170.

In determining whether partial update is applicable to the image frame, scheme 100 may involve the processor considering one or more factors. Referring to scenario 500 shown in FIG. 5, scheme 100 may involve the processor considering factors related to the size of a partial frame relative to a full frame. Additionally or alternatively, scheme 100 may involve the processor considering factors related to histograms and/or pixel counts of the partial frame and full frame. In part (A) of scenario 500, a partial frame (PF) is compared to a full frame (FF) for a given image frame. In determining whether partial update is applicable to the image frame, scheme 100 may involve the processor determining whether the width of the partial frame ($PF_{width}$) is less than the width of the full frame ($FF_{width}$), whether the height of the partial frame ($PF_{height}$) is less than the height of the full frame ($FF_{height}$), and/or whether the area (or size) of the partial frame ($PF_{area}$) is less than the area, or size, of the full frame ($FF_{area}$). The processor may determine that partial frame is applicable to the image frame in the event that the width of the partial frame is less than the width of the full frame, the height of the partial frame is less than the height of the full frame, and/or the area of the partial frame is less than the area of the full frame. Conversely, the processor may determine that partial frame is not applicable to the image frame in the event that the width of the partial frame is not less than the width of the full frame, the height of the partial frame is not less than the height of the full frame, and/or the area of the partial frame is not less than the area of the full frame.

In part (B) of scenario 500, a sum of histogram pixel count of the partial frame is compared to a sum of histogram pixel count of the full frame. The processor may determine that partial frame is applicable to the image frame in the event that the sum of histogram pixel count of the partial frame is less than the sum of histogram pixel count of the full frame. Conversely, the processor may determine that partial frame is not applicable to the image frame in the event that the sum of histogram pixel count of the partial frame is less than the sum of histogram pixel count of the full frame.

At 140, scheme 100 may involve the processor recovering full-frame information (FFI) of a partial frame of the image frame to determine whether it is still proper to keep the same effect of the nearest full frame. That is, the application may instruct the processor to perform partial update on a given image frame and, thus, may provide the processor with partial-frame information instead of full-frame information. Scheme 100 may proceed from 140 to 150.

In recovering full-frame information of the partial frame of the image frame, scheme 100 may involve the processor performing a frame property extraction (FPE) function. Referring to scenario 600 shown in FIG. 6, scheme 100 may involve the processor performing the frame property extraction function to recover the full-frame information for a number of frame, including $Frame_{N-1}$, $Frame_N$ and $Frame_{N+1}$. For instance, the processor may obtain full-frame information for $Frame_{N-1}$ by performing perform the frame property extraction function on $Frame_{N-1}$, denoted as $FFI_{N-1}=FPE(Frame_{N-1})$ in FIG. 6. The processor may obtain full-frame information for $Frame_N$ based on full-frame information of $Frame_{N-1}$ by subtracting a result of frame property extraction of preframe information of partial frame $Frame_N$ ($PreFrame_N$) and adding a result of frame property extraction of partial frame $Frame_N$, denoted as $FFI_N=FFI_{N-1}-FPE(PreFrame_N)+FPE(Frame_N)$ in FIG. 6. Similarly, the processor may obtain full-frame information for partial frame $Frame_{N+1}$ based on full-frame information of $Frame_N$ by subtracting a result of frame property extraction of preframe information of $Frame_{N+1}$ ($PreFrame_{N+1}$) and adding a result of frame property extraction of $Frame_{N+1}$, denoted as $FFI_{N+1}=FFI_N-FPE(PreFrame_{N+1})+FPE(Frame_{N+1})$ in FIG. 6.

Figure 7:
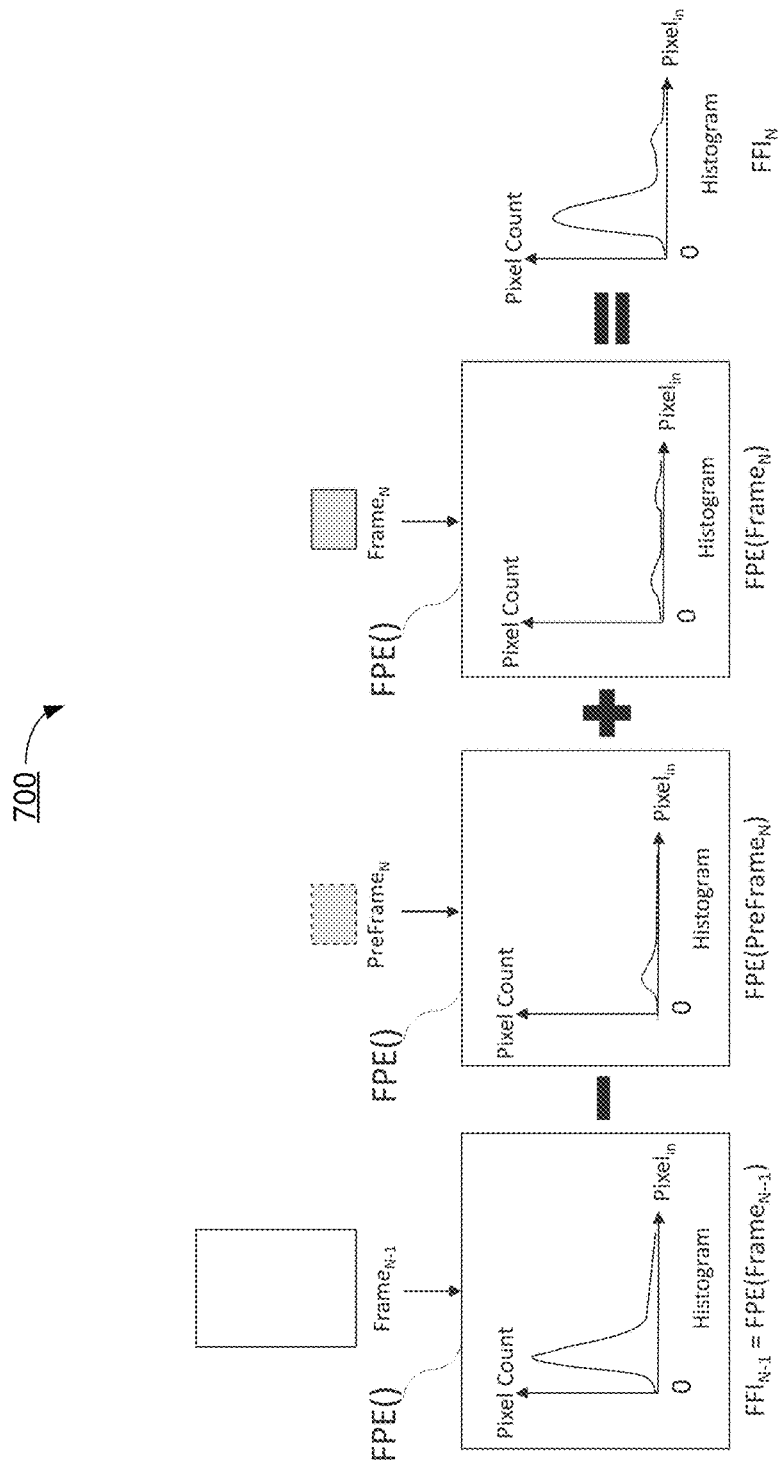
FIG. 7 is a diagram of an example scenario in accordance with an implementation of the present disclosure.
Figure 8:
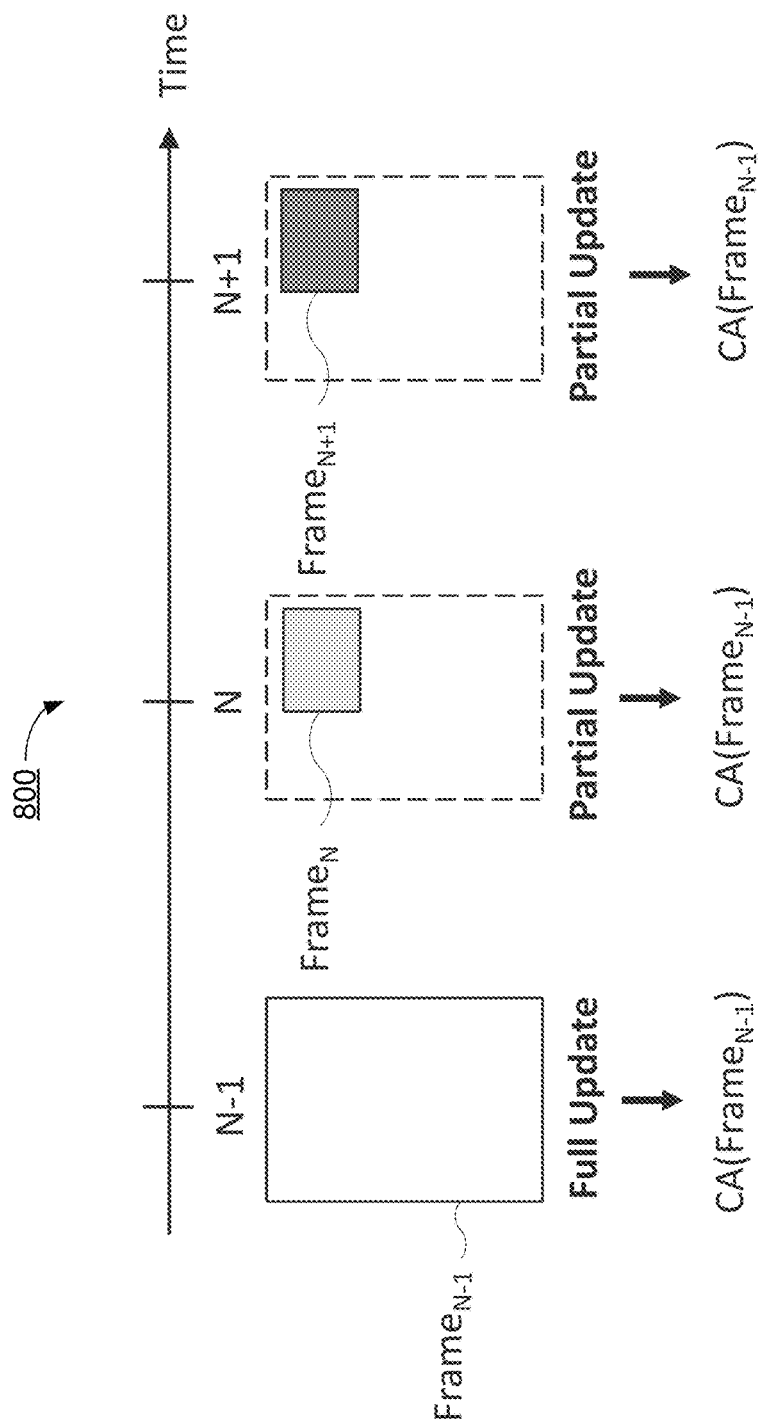
FIG. 8 is a diagram of an example scenario in accordance with an implementation of the present disclosure.

Referring to scenario 700 shown in FIG. 7, in some implementations, the frame property extraction function may represent a function of generating a histogram of a given image frame. For instance, as shown in FIG. 7, the full-frame information of $Frame_{N-1}$, or $FFI_{N-1}$, as a result of the frame property extraction function on $Frame_{N-1}$, or $FPE(Frame_{N-1})$, may be obtained from a histogram of $Frame_{N-1}$. Similarly, the result of the frame property extraction function on $PreFrame_N$, or $FPE(PreFrame_N)$, may be a histogram of partial frame $PreFrame_N$, which is a partial frame or a portion of image frame of $Frame_{N-1}$. Likewise, the result of the frame property extraction function on $Frame_N$, or $FPE(Frame_N)$, may be a histogram of partial frame $Frame_N$, which is a partial frame or a portion of image frame $Frame_N$. Accordingly, the full-frame information or histogram of $Frame_N$, or $FFI_N$, may be expressed as follows: $FFI_N=FFI_{N-1}-FPE(PreFrame_N)+FPE(Frame_N)$.

At 150, scheme 100 may involve the processor determining whether at least a difference between one or more properties of the image frame and one or more properties of a previous image frame exceeds a threshold. For instance, for the image frame of $Frame_N$, the processor may determine whether the difference ($D_N$) between one or more properties of $Frame_N$ and one or more properties of $Frame_{N-1}$ exceeds a threshold. In some implementations, $D_N$ may be defined as the absolute value of a difference between the full-frame information of $Frame_N$ and the full-frame information of $Frame_{N-1}$, or $D_N=|FFI_N-FFI_{N-1}|$. In some implementations, the threshold may be set to be the absolute value of a difference between the full-frame information of $Frame_N$ and the full-frame information of $Frame_{N-1}$. When the value of $D_N$ is excessive (e.g., being too large), the processor may determine that it is not proper to keep the effect of the nearest full frame (e.g., $Frame_{N-1}$) to avoid degradation in picture quality. In some implementations, the one or more properties of an image frame in concern may include, for example and without limitation, a pixel count, a histogram of pixel count, motion vectors and other characteristics associated with a given image frame. In an event that the difference exceeds the threshold, scheme 100 may proceed from 150 to 180. In an event that the difference does not exceed the threshold, scheme 100 may proceed from 150 to 160.

At 180, scheme 100 may involve the processor sending a signal or message to the application to request for full-frame information for a subsequent image frame and to perform full update on the subsequent image frame. Scheme 100 may proceed from 180 to 110 for the processor to receive a subsequent image frame (and corresponding instruction) from the application for processing.

At 160, scheme 100 may involve the processor performing a partial-frame processing on the image frame for partial update. Scheme 100 may proceed from 160 to 110 for the processor to receive a subsequent image frame (and corresponding instruction) from the application for processing.

In performing the partial-frame processing on the image frame, scheme 100 may involve the processor taking partial-frame content of a current image frame as input and keeping effect of the nearest full frame. Referring to scenario 800 shown in FIG. 8, among the image frames of $Frame_{N-1}$, $Frame_N$ and $Frame_{N+1}$, $Frame_{N-1}$ may be obtained by a full-frame processing for full update while each of $Frame_N$ and $Frame_{N+1}$ may be obtained by respective partial-frame processing for partial update. Accordingly, $Frame_{N-1}$ may be the nearest full frame for each of $Frame_N$ and $Frame_{N+1}$. For instance, a full-frame processing on image frame $Frame_{N-1}$ for full update may be obtained by performing the content adjustment function on $Frame_{N-1}$, denoted as $CA(Frame_{N-1})$ in FIG. 8. The partial update for image frames $Frame_N$ and $Frame_{N+1}$ may be obtained on partial-frame processing, using partial frame of $Frame_N$ and partial frame of $Frame_{N+1}$ respectively, on the outcome of $CA(Frame_{N-1})$.

Illustrative Implementations

Figure 9:
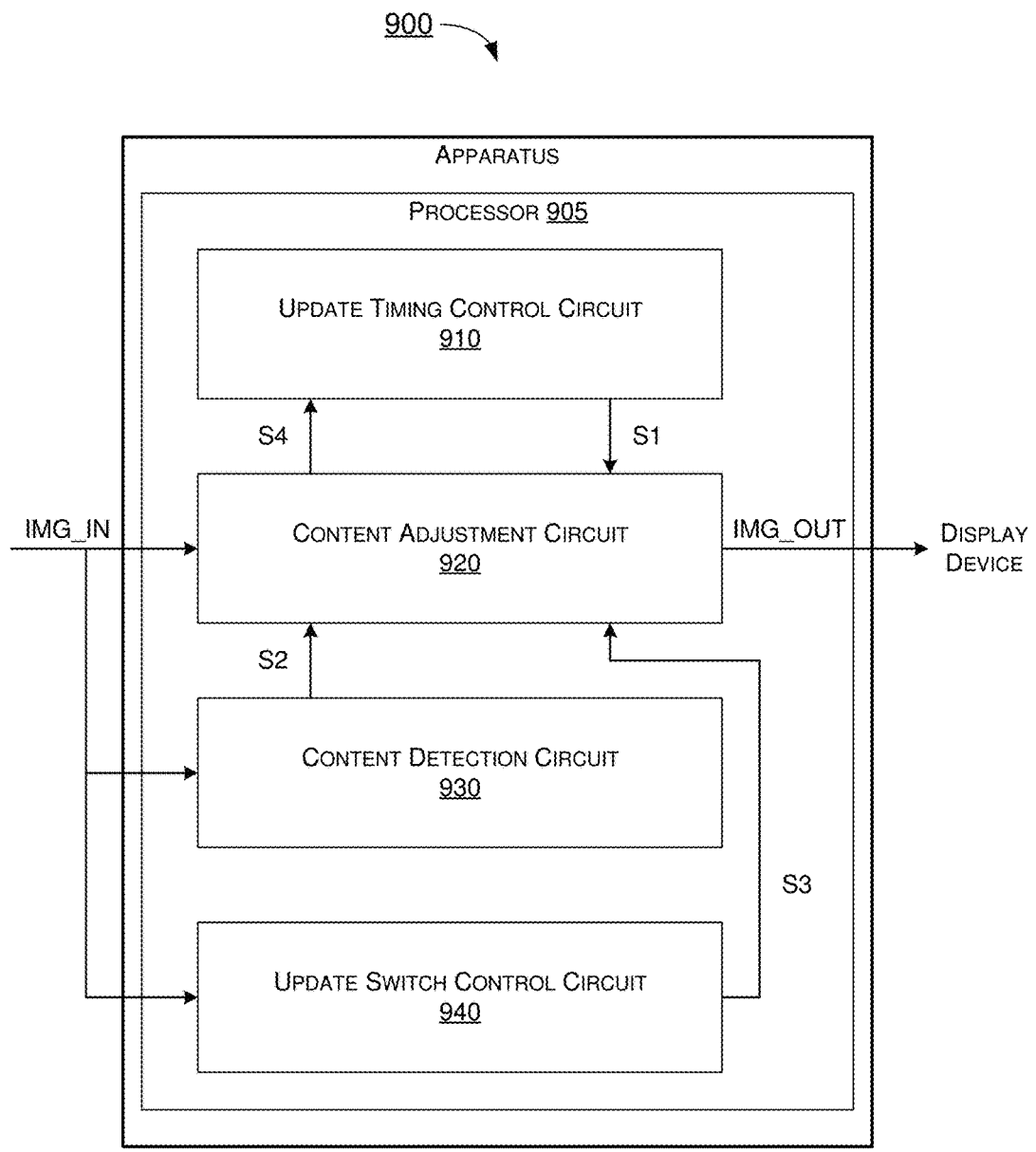
FIG. 9 is a block diagram of an example apparatus in accordance with an implementation of the present disclosure.

FIG. 9 illustrates an example apparatus 900 in accordance with an implementation of the present disclosure. Apparatus 900 may perform various functions to implement schemes, techniques, processes and methods described herein pertaining to adaptive display partial update, including scheme 100 and scenarios 200-800 described above as well as processes 1000 and 1100 described below. Apparatus 900 may be a part of an electronic apparatus, which may be a wireless communication device, a computing apparatus, a portable or mobile apparatus, or a wearable apparatus. For instance, apparatus 900 may be implemented in a smartphone, a smartwatch, a personal digital assistant, a television, or a computing device such as a tablet computer, a laptop computer, a notebook computer, a desktop computer, or a server. Alternatively, apparatus 900 may be implemented in the form of one or more integrated-circuit (IC) chips such as, for example and not limited to, one or more single-core processors, one or more multi-core processors, or one or more complex-instruction-set-computing (CISC) processors. Apparatus 900 may include one, some or all of the components shown in FIG. 9. Apparatus 900 may also include one or more other components not be pertinent to various embodiments of the present disclosure and, thus, such component(s) is/are not shown in FIG. 9 and a description thereof is not provided herein in the interest of brevity.

Apparatus 900 may include a processor 905. In some implementations, processor 905 may be an image processor, an image signal processor (ISP) or a digital signal processor (DSP). In one aspect, processor 905 may be implemented in the form of one or more single-core processors, one or more multi-core processors, or one or more CISC processors. That is, even though a singular term "a processor" is used herein to refer to processor 905, processor 905 may include multiple processors in some implementations and a single processor in other implementations in accordance with the present disclosure. In another aspect, processor 905 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 905 is a special-purpose machine specifically designed, arranged and configured to perform specific tasks including adaptive display partial update in accordance with various implementations of the present disclosure.

In some implementations, processor 905 may include an update timing control circuit 910, a content adjustment circuit 920, a content detection circuit 930 and an update switch control circuit 940, as illustrated in the example shown in FIG. 9. Processor 905 may be capable of receiving a number of input image frames (denoted as "IMG_IN" in FIG. 9) for processing to provide a corresponding number of output image frames (denoted as "IMG_OUT" in FIG. 9) for display by a display device, which may or may not be a part of apparatus 900.

In some implementations, update timing control circuit 910 may be capable of performing operations pertaining to block 120 of scheme 100. For instance, update timing control circuit 910 may be capable of determining whether partial update for each input image frame of one or more input image frames received by processor 905 is allowed.

In some implementations, content detection circuit 930 may be capable of performing operations pertaining to block 130 of scheme 100. For instance, content detection circuit 930 may be capable of determining whether the partial update is applicable to a given input image frame responsive to a determination that the partial update for the input image frame is allowed.

In some implementations, update switch control circuit 940 may be capable of performing operations pertaining to blocks 140, 150 and 180 of scheme 100. For instance, update switch control circuit 940 may be capable of determining whether at least a difference between one or more properties of the input image frame and one or more properties of a previous image frame exceeds a threshold responsive to a determination that the partial update is applicable to the input image frame.

In some implementations, content adjustment circuit 920 may be capable of performing operations pertaining to blocks 160 and 170 of scheme 100. For instance, content adjustment circuit 920 may be capable of performing a partial-frame processing to partially update the input image frame to provide a respective one of the one or more output image frames responsive to a determination that the difference does not exceed the threshold. Moreover, content adjustment circuit 920 may be capable of performing a full-frame processing to fully update the input image frame to provide a respective one of the one or more output image frames responsive to a determination that the difference does exceed the threshold.

In some implementations, in determining whether the partial update for the image frame is allowed, update timing control circuit 910 may be capable of performing a number of operations. For instance, update timing control circuit 910 may determine whether a steady state is achievable with a full-frame processing. Additionally, update timing control circuit 910 may determine that the partial update for the image frame is allowed responsive to a determination that the steady state is achievable with the full-frame processing. Moreover, update timing control circuit 910 may determine that the partial update for the image frame is not allowed responsive to a determination that the steady state is not achievable with the full-frame processing. The steady state may be a state in which an effect of content adjustment for the image frame does not change with time.

In some implementations, in determining whether the partial update is applicable to the image frame, content detection circuit 930 may be capable of determining one or more of the following: whether a width of a partial frame of the image frame is less than a width of a full frame of the image frame, whether a height of the partial frame of the image frame is less than a height of the full frame of the image frame, and whether an area of the partial frame of the image frame is less than an area of the full frame of the image frame. Additionally or alternatively, in determining whether the partial update is applicable to the image frame, content detection circuit 930 may be capable of determining whether a sum of histogram pixel count of a partial frame of the image frame is less than a sum of histogram pixel count of a full frame of the image frame.

In some implementations, in determining whether at least the difference between one or more properties of the image frame and one or more properties of the previous image frame exceeds the threshold, update switch control circuit 940 may be capable of determining whether an absolute value of a difference between full-frame information of the image frame and full-frame information of the previous image frame exceeds the threshold.

In some implementations, in performing the partial-frame processing to partially update the image frame, content adjustment circuit 920 may be capable of performing the partial-frame processing using partial-frame content of the image frame as input while keeping an effect of a nearest full frame.

In some implementations, update switch control circuit 940 may be also capable of recovering full-frame information of a partial frame of the image frame to determine whether keeping an effect of a nearest full frame is proper. For instance, update switch control circuit 940 may determine full-frame information of the nearest full frame by performing a frame property extraction function on the nearest full frame. Moreover, update switch control circuit 940 may subtract, from the full-frame information of the nearest full frame, a result of a frame property extraction function on preframe information of the image frame. Furthermore, update switch control circuit 940 may add, to the full-frame information of the nearest full frame, a result of a frame property extraction function on a partial frame of the image frame.

Figure 10:
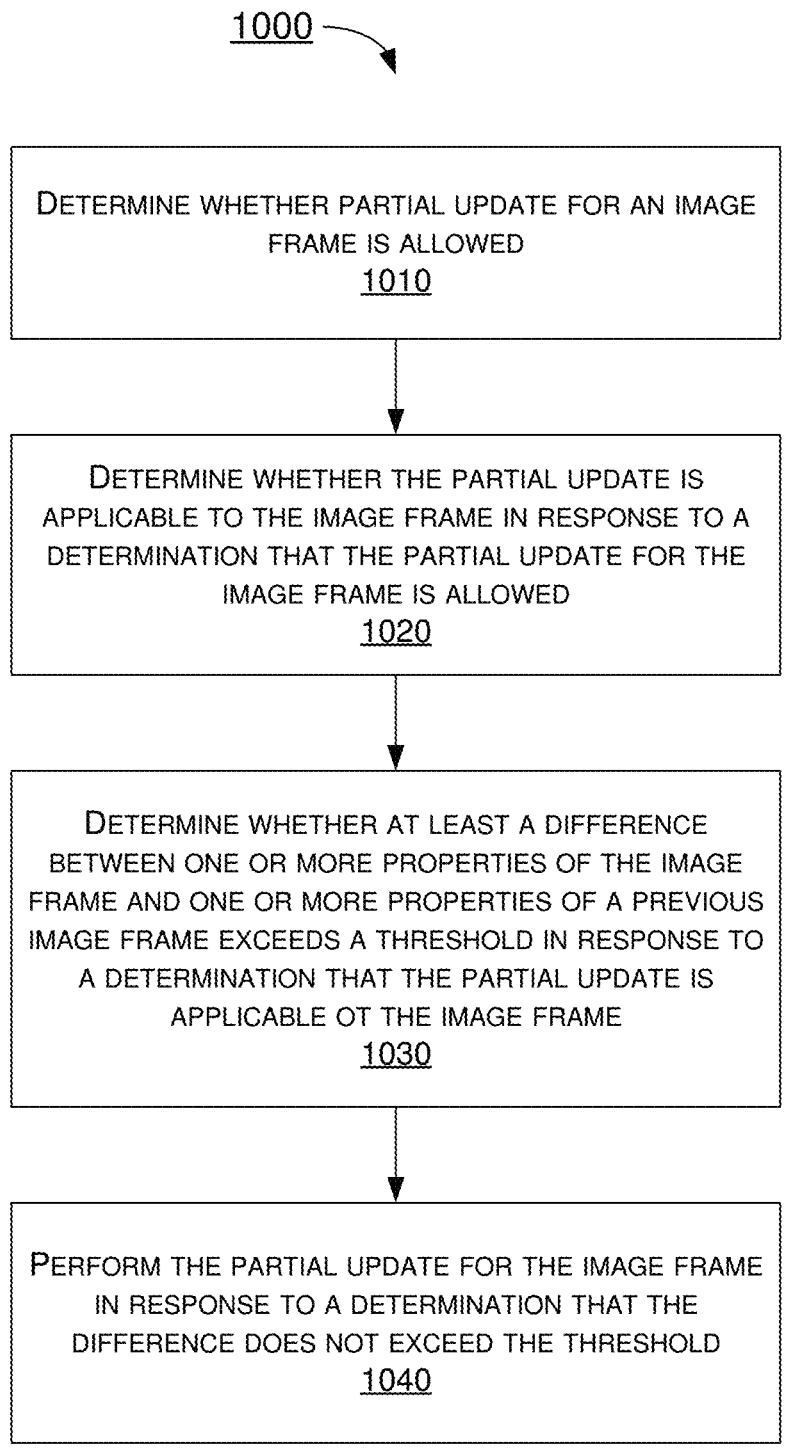
FIG. 10 is a flowchart of an example process in accordance with an implementation of the present disclosure.

FIG. 10 illustrates an example process 1000 in accordance with an implementation of the present disclosure. Process 1000 may be an example implementation of any of scheme 100 and/or any of scenarios 200-800, whether partially or completely, with respect to adaptive display partial update in accordance with the present disclosure. Process 1000 may represent an aspect of implementation of features of apparatus 900. Process 1000 may include one or more operations, actions, or functions as illustrated by one or more of blocks 1010, 1020, 1030 and 1040. Although illustrated as discrete blocks, various blocks of process 1000 may be divided into additional blocks, combined into fewer blocks, or eliminated, depending on the desired implementation. Moreover, the blocks of process 1000 may executed in the order shown in FIG. 10 or, alternatively, in a different order. Process 1000 may be implemented by apparatus 900. Solely for illustrative purposes and without limitation, process 1000 is described below in the context of apparatus 900. Process 1000 may begin at block 1010.

At 1010, process 1000 may involve processor 905 of apparatus 900 determining whether partial update for an image frame is allowed. Process 1000 may proceed from 1010 to 1020.

At 1020, process 1000 may involve processor 905 determining whether the partial update is applicable to the image frame responsive to a determination that the partial update for the image frame is allowed. Process 1000 may proceed from 1020 to 1030.

At 1030, process 1000 may involve processor 905 determining whether at least a difference between one or more properties of the image frame and one or more properties of a previous image frame exceeds a threshold responsive to a determination that the partial update is applicable to the image frame. Process 1000 may proceed from 1030 to 1040.

At 1040, process 1000 may involve processor 905 performing a partial-frame processing to partially update the image frame responsive to a determination that the difference does not exceed the threshold.

In some implementations, in determining whether the partial update for the image frame is allowed, process 1000 may involve processor 905 performing a number of operations. For instance, process 1000 may involve processor 905 determining whether a steady state is achievable with a full-frame processing. Additionally, process 1000 may involve processor 905 determining that the partial update for the image frame is allowed responsive to a determination that the steady state is achievable with the full-frame processing. Moreover, process 1000 may involve processor 905 determining that the partial update for the image frame is not allowed responsive to a determination that the steady state is not achievable with the full-frame processing. The steady state may be a state in which an effect of content adjustment for the image frame does not change with time.

In some implementations, in determining whether the partial update is applicable to the image frame, process 1000 may involve processor 905 determining one or more of the following: whether a width of a partial frame of the image frame is less than a width of a full frame of the image frame, whether a height of the partial frame of the image frame is less than a height of the full frame of the image frame, and whether an area of the partial frame of the image frame is less than an area of the full frame of the image frame. Additionally or alternatively, in determining whether the partial update is applicable to the image frame, process 1000 may involve processor 905 determining whether a sum of histogram pixel count of a partial frame of the image frame is less than a sum of histogram pixel count of a full frame of the image frame.

In some implementations, in determining whether at least the difference between one or more properties of the image frame and one or more properties of the previous image frame exceeds the threshold, process 1000 may involve processor 905 determining whether an absolute value of a difference between full-frame information of the image frame and full-frame information of the previous image frame exceeds the threshold.

In some implementations, in performing the partial-frame processing to partially update the image frame, process 1000 may involve processor 905 performing the partial-frame processing using partial-frame content of the image frame as input while keeping an effect of a nearest full frame.

In some implementations, process 1000 may also involve processor 905 recovering full-frame information of a partial frame of the image frame to determine whether keeping an effect of a nearest full frame is proper. For instance, process 1000 may involve processor 905 determining full-frame information of the nearest full frame by performing a frame property extraction function on the nearest full frame. Moreover, process 1000 may involve processor 905 subtracting, from the full-frame information of the nearest full frame, a result of a frame property extraction function on preframe information of the image frame. Furthermore, process 1000 may involve processor 905 adding, to the full-frame information of the nearest full frame, a result of a frame property extraction function on a partial frame of the image frame.

Figure 11:
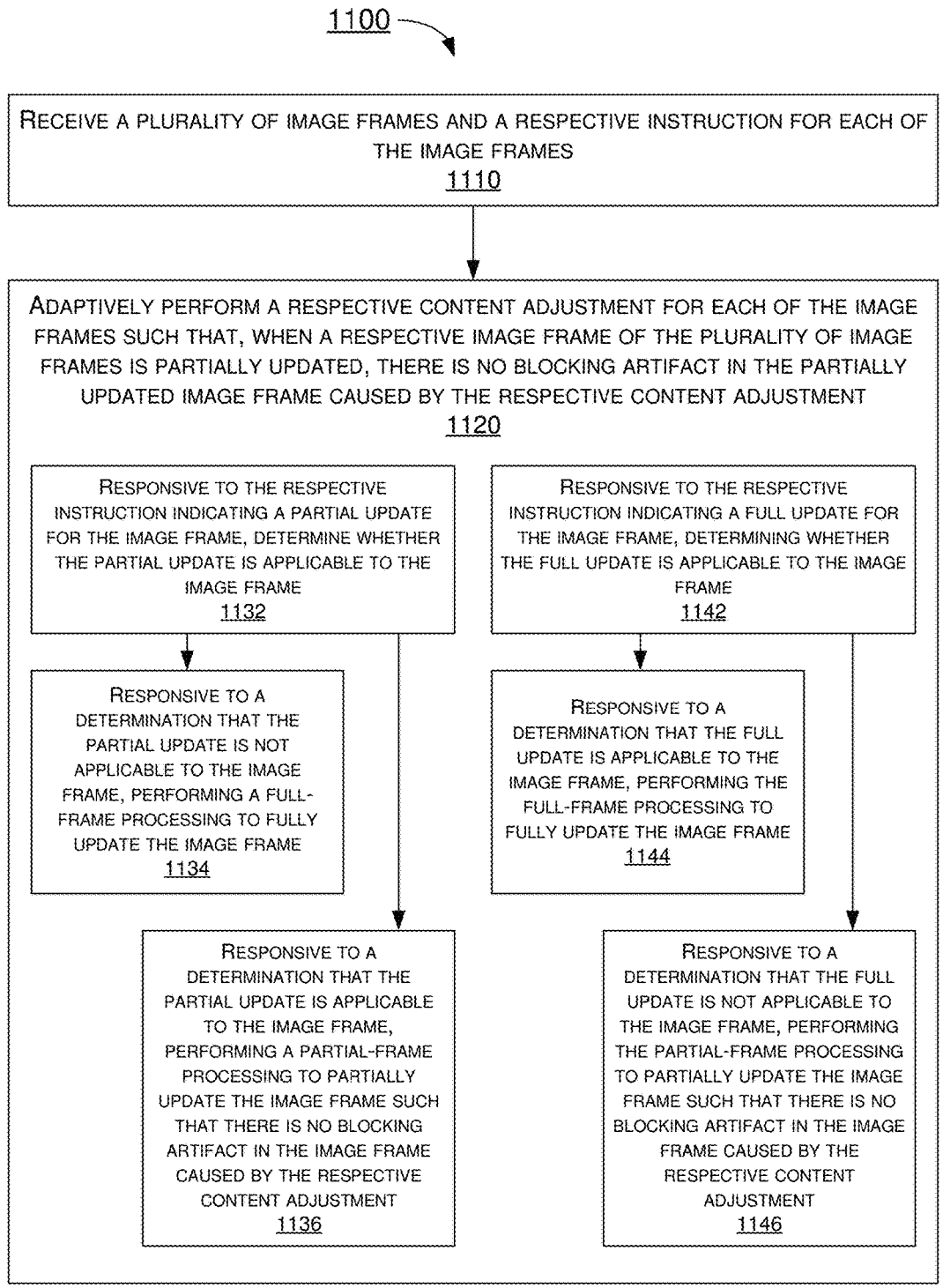
FIG. 11 is a flowchart of an example process in accordance with an implementation of the present disclosure.

FIG. 11 illustrates an example process 1100 in accordance with an implementation of the present disclosure. Process 1100 may be an example implementation of any of scheme 110 and/or any of scenarios 200-800, whether partially or completely, with respect to adaptive display partial update in accordance with the present disclosure. Process 1100 may represent an aspect of implementation of features of apparatus 900. Process 1100 may include one or more operations, actions, or functions as illustrated by one or more of blocks 1110 and 1120 as well as sub-blocks 1132, 1134, 1136, 1142, 1144 and 1146. Although illustrated as discrete blocks, various blocks of process 1100 may be divided into additional blocks, combined into fewer blocks, or eliminated, depending on the desired implementation. Moreover, the blocks of process 1100 may executed in the order shown in FIG. 11 or, alternatively, in a different order. Process 1100 may be implemented by apparatus 900. Solely for illustrative purposes and without limitation, process 1100 is described below in the context of apparatus 900. Process 1100 may begin at block 1110.

At 1110, process 1100 may involve processor 905 of apparatus 900 receiving a plurality of image frames. Optionally, process 1100 may also involve processor 905 receiving a respective instruction for each image frame of the plurality of image frames. Process 1100 may proceed from 1110 to 1120.

At 1120, process 1100 may involve processor 905 adaptively performing a respective content adjustment for each image frame of the plurality of image frames such that, when a respective image frame of the plurality of image frames is partially updated, there is no blocking artifact in the partially updated image frame caused by the respective content adjustment.

In some implementations, in adaptively performing the respective content adjustment for each image frame of the plurality of image frames, process 1100 may involve processor 905 performing a number of operations for each image frame of the one or more image frames, as shown in sub-blocks 1132, 1134 and 1136. At 1132, responsive to the respective instruction indicating a partial update for the image frame, process 1100 may involve processor 905 determining whether the partial update is applicable to the image frame. At 1134, responsive to a determination that the partial update is not applicable to the image frame, process 1100 may involve processor 905 performing a full-frame processing to fully update the image frame. At 1136, responsive to a determination that the partial update is applicable to the image frame, process 1100 may involve processor 905 performing a partial-frame processing to partially update the image frame such that there is no blocking artifact in the image frame caused by the respective content adjustment.

In some implementations, in performing the respective update by performing operations for each image frame of the one or more image frames, process 1100 may also involve processor 905 performing additional operations, as shown in sub-blocks 1142, 1144 and 1146. At 1142, responsive to the respective instruction indicating a full update for the image frame, process 1100 may involve processor 905 determining whether the full update is applicable to the image frame. At 1144, responsive to a determination that the full update is applicable to the image frame, process 1100 may involve processor 905 performing the full-frame processing to fully update the image frame. At 1146, responsive to a determination that the full update is not applicable to the image frame, process 1100 may involve processor 905 performing the partial-frame processing to partially update the image frame such that there is no blocking artifact in the image frame caused by the respective content adjustment.

In some implementations, in adaptively performing the respective content adjustment for each image frame of the plurality of image frames, process 1100 may involve processor 905 performing a number of operations for at least one image frame of the plurality of image frames. For instance, process 1100 may involve processor 905 determining whether partial update for the image frame is allowed.

Additionally, process 1100 may involve processor 905 determining whether the partial update is applicable to the image frame responsive to a determination that the partial update for the image frame is allowed. Moreover, process 1100 may involve processor 905 determining whether at least a difference between one or more properties of the image frame and one or more properties of a previous image frame exceeds a threshold responsive to a determination that the partial update is applicable to the image frame. Furthermore, process 1100 may involve processor 905 performing a partial-frame processing to partially update the image frame responsive to a determination that the difference does not exceed the threshold.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining whether partial update for an image frame is allowed;
   determining whether the partial update is applicable to the image frame responsive to a determination that the partial update for the image frame is allowed;
   determining whether at least a difference between one or more properties of the image frame and one or more properties of a previous image frame exceeds a threshold responsive to a determination that the partial update is applicable to the image frame; and
   performing a partial-frame processing to partially update the image frame responsive to a determination that the difference does not exceed the threshold.

2. The method of claim 1, wherein the determining of whether the partial update for the image frame is allowed comprises:
   determining whether a steady state is achievable with a full-frame processing;
   determining that the partial update for the image frame is allowed responsive to a determination that the steady state is achievable with the full-frame processing; and
   determining that the partial update for the image frame is not allowed responsive to a determination that the steady state is not achievable with the full-frame processing,
   wherein the steady state comprises a state in which an effect of content adjustment for the image frame does not change with time.

3. The method of claim 1, wherein the determining of whether the partial update is applicable to the image frame comprises determining one or more of:
- whether a width of a partial frame of the image frame is less than a width of a full frame of the image frame;
- whether a height of the partial frame of the image frame is less than a height of the full frame of the image frame; and
- whether an area of the partial frame of the image frame is less than an area of the full frame of the image frame.

4. The method of claim 1, wherein the determining of whether the partial update is applicable to the image frame comprises determining whether a sum of histogram pixel count of a partial frame of the image frame is less than a sum of histogram pixel count of a full frame of the image frame.

5. The method of claim 1, wherein the determining of whether at least the difference between one or more properties of the image frame and one or more properties of the previous image frame exceeds the threshold comprises determining whether an absolute value of a difference between full-frame information of the image frame and full-frame information of the previous image frame exceeds the threshold.

6. The method of claim 1, wherein the performing of the partial-frame processing to partially update the image frame comprises performing the partial-frame processing using partial-frame content of the image frame as input while keeping an effect of a nearest full frame.

7. The method of claim 1, further comprising:
recovering full-frame information of a partial frame of the image frame to determine whether keeping an effect of a nearest full frame is proper.

8. The method of claim 7, wherein the recovering of the partial frame of the full-frame information of the image frame comprises:
- determining full-frame information of the nearest full frame by performing a frame property extraction function on the nearest full frame;
- subtracting, from the full-frame information of the nearest full frame, a result of a frame property extraction function on preframe information of the image frame; and
- adding, to the full-frame information of the nearest full frame, a result of a frame property extraction function on a partial frame of the image frame.

9. An apparatus, comprising:
a processor capable of receiving one or more input image frames to provide one or more output image frames, the processor comprising:
- an update timing control circuit capable of determining whether partial update for each input image frame of the one or more input image frames is allowed;
- a content detection circuit capable of determining whether the partial update is applicable to the input image frame responsive to a determination that the partial update for the input image frame is allowed;
- an update switch control circuit capable of determining whether at least a difference between one or more properties of the input image frame and one or more properties of a previous image frame exceeds a threshold responsive to a determination that the partial update is applicable to the input image frame; and
- a content adjustment circuit capable of performing at least a partial-frame processing to partially update the input image frame to provide a respective one of the one or more output image frames responsive to a determination that the difference does not exceed the threshold.

10. The apparatus of claim 9, wherein, in determining whether the partial update for the image frame is allowed, the update timing control circuit is capable of performing operations comprising:
- determining whether a steady state is achievable with a full-frame processing;
- determining that the partial update for the image frame is allowed responsive to a determination that the steady state is achievable with the full-frame processing; and
- determining that the partial update for the image frame is not allowed responsive to a determination that the steady state is not achievable with the full-frame processing,
wherein the steady state comprises a state in which an effect of content adjustment for the image frame does not change with time.

11. The apparatus of claim 9, wherein, in determining whether the partial update is applicable to the image frame, the content detection circuit is capable of determining one or more of:
- whether a width of a partial frame of the image frame is less than a width of a full frame of the image frame;
- whether a height of the partial frame of the image frame is less than a height of the full frame of the image frame; and
- whether an area of the partial frame of the image frame is less than an area of the full frame of the image frame.

12. The apparatus of claim 9, wherein, in determining whether the partial update is applicable to the image frame, the content detection circuit is capable of determining whether a sum of histogram pixel count of a partial frame of the image frame is less than a sum of histogram pixel count of a full frame of the image frame.

13. The apparatus of claim 9, wherein, in determining whether at least the difference between one or more properties of the image frame and one or more properties of the previous image frame exceeds the threshold, the update switch control circuit is capable of determining whether an absolute value of a difference between full-frame information of the image frame and full-frame information of the previous image frame exceeds the threshold.

14. The apparatus of claim 9, wherein, in performing the partial-frame processing to partially update the image frame, the content adjustment circuit is capable of performing the partial-frame processing using partial-frame content of the image frame as input while keeping an effect of a nearest full frame.

15. The apparatus of claim 9, wherein the update switch control circuit is also capable of recovering full-frame information of a partial frame of the image frame to determine whether keeping an effect of a nearest full frame is proper.

16. The apparatus of claim 15, wherein, in recovering the partial frame of the full-frame information of the image frame, the update switch control circuit is capable of performing operations comprising:
- determining full-frame information of the nearest full frame by performing a frame property extraction function on the nearest full frame;
- subtracting, from the full-frame information of the nearest full frame, a result of a frame property extraction function on preframe information of the image frame; and adding, to the full-frame information of the nearest full frame, a result of a frame property extraction function on a partial frame of the image frame.

\* \* \* \* \*